Sept. 24, 1963   E. M. AMIR ET AL   3,105,017
EXTRACTIVE DISTILLATION OF ETHYLBENZENE
Filed June 22, 1960
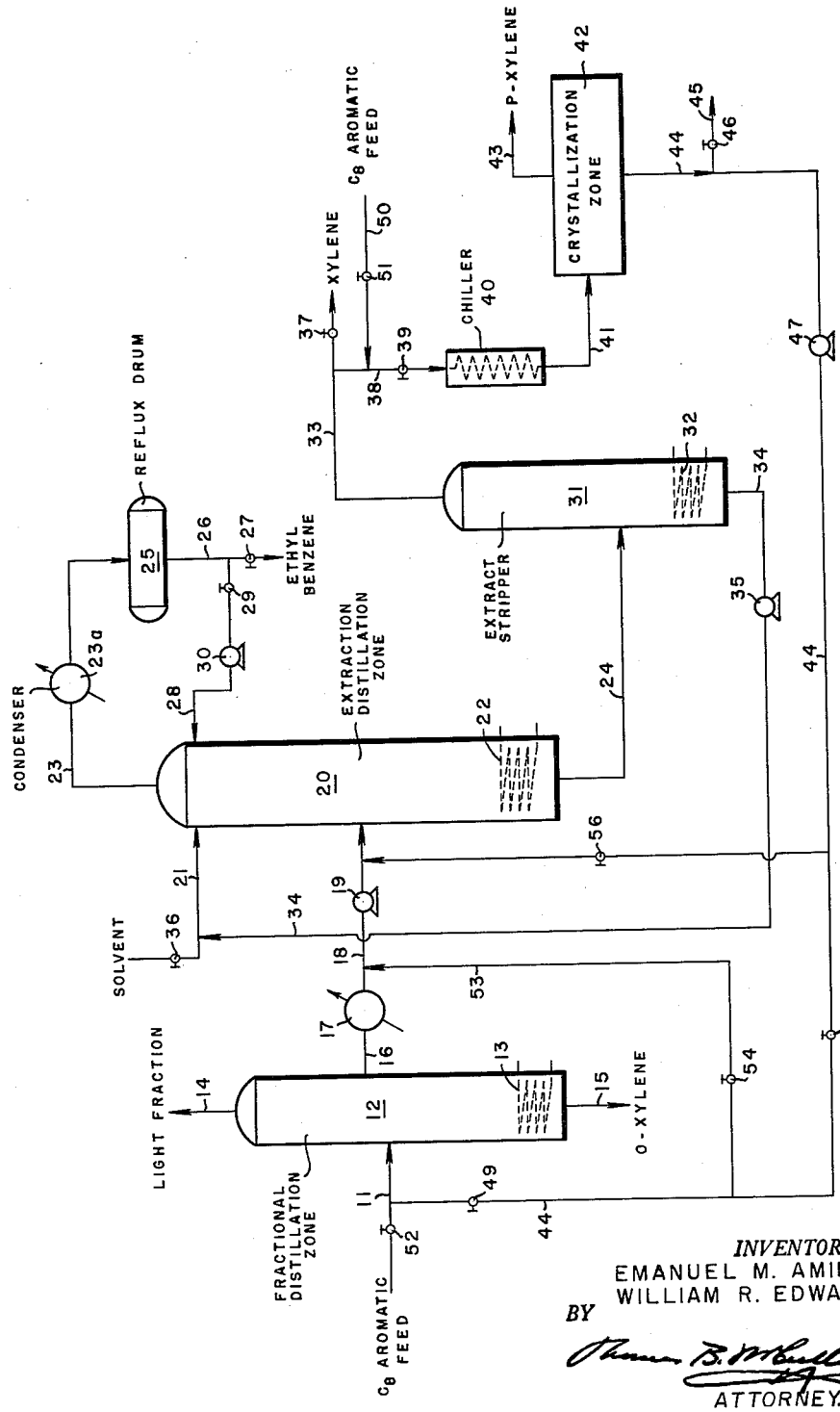
INVENTORS.
EMANUEL M. AMIR,
WILLIAM R. EDWARDS,
BY
ATTORNEY.

3,105,017
**EXTRACTIVE DISTILLATION OF ETHYL-
BENZENE**
Emanuel M. Amir and William R. Edwards, Baytown, Tex., assignors, by mesne assignments, to Esso Research and Engineering Company, Elizabeth, N.J., a corporation of Delaware
Filed June 22, 1960, Ser. No. 38,066
7 Claims. (Cl. 202—39.5)

The present invention is directed to a method for separating ethylbenzene from its mixtures. More particularly, the invention is concerned with separating ethylbenzene from its mixtures with xylene. In its more specific aspects, the invention is concerned with a method for separating ethylbenzene by extractive distillation from the xylenes.

The present invention may be briefly described as a method for separating a mixture consisting essentially of ethylbenzene and at least one member selected from the group consisting of orthoxylene, metaxylene, and paraxylene. In practicing the present invention, the mixture is distilled in the presence of a compound containing a single benzene ring substituted on the ring in at least two positions with a group selected from the chloro and nitro groups under conditions to separate a fraction enriched in ethylbenzene.

The substituents may be all chloro groups and may be two chloro groups or three or more chloro groups. The substituents may also be all nitro groups. It is also contemplated that the substituents may include both chloro and nitro groups. Where all positions are not substituted by chloro and nitro groups, other substituents such as alkyl, hydroxyl, and alkoxyl groups may be substituted in those positions. Preferably, the substituents are para to each other and, where more than two substituents are employed, the substituents are preferably in the 1, 2, 4 position where three substituent groups are on the benzene ring.

The problem of separating ethylbenzene from its mixtures with the xylenes is quite considerable in that ethylbenzene boils quite closely to the three xylenes. To illustrate the closeness of the boiling points, reference may be had to Table I which follows:

*Table I*

| | B.P. ° C. |
|---|---|
| Ethylbenzene | 136.19 |
| p-Xylene | 138.35 |
| m-Xylene | 139.10 |
| o-Xylene | 144.41 |

By reference to Table I, it will be seen that ethylbenzene boils closely to meta and paraxylene and also to orthoxylene. However, orthoxylene may, if desired, be distilled from the ethylbenzene by ordinary fractional distillation. In the practice of the present invention, however, the orthoxylene may be extractively distilled using a solvent as will be described further hereinafter.

The solvent employed in the practice of the present invention is suitably a solvent such as a compound containing a single benzene ring substituted on the ring in at least two positions with an active group selected from the chloro and nitro groups. While in the practice of the present invention at least two substituents may be on the benzene groups, it is possible to have more than two substituents and is further contemplated, in fact, preferred, to have three active substituent groups on the benzene ring. Furthermore, it is preferred that two of the substituents be para to each other and where three groups are employed, the substituents are preferably in the 1, 2, 4 position to get best results.

As illustrative of the compounds which are suitable in the practice of the present invention, reference is had to Table II where the solvents useful in the present invention are listed and compared with other solvents. The relative volatilities ($\alpha$) of ethylbenzene to paraxylene in the presence of several solvents are shown under the conditions:

Temperature, 110° C.
Ethylbenzene:paraxylene:solvent, 1:1:2 mole ratio

*Table II*

| Solvent: | $\alpha$ |
|---|---|
| o-Dichlorobenzene | 1.095 |
| p-Dichlorobenzene | 1.116 |
| 1,2,4-trichlorobenzene | 1.125 |
| 1,2,3-trichlorobenzene | 1.120 |
| 2,4,6-trichlorophenol | 1.136 |
| 2,4,5-trichlorophenol | 1.147 |
| o-Chloroanisole | 1.054 |
| p-Chloroanisole | 1.075 |
| p-Nitroanisole | 1.085 |
| p-Chlorophenol | 1.090 |
| o-Chloronitrobenzene | 1.094 |
| Pentachlorobutoxybenzene | 1.26 |

It will be seen in Table II that one active group is not as effective as two or more. Also, where two active groups are present on the benzene ring, the substituents, which are para to each other, produce a greater alpha value than where the substituents are in the ortho or other position. Furthermore, it will be clear that where three active groups are employed when they are substituted in the 1, 2, 4 position, a high alpha value is obtained.

Other compounds falling within the purview of this invention include compounds of the nature of pentachlorophenyl-n-butyl ether and pentachlorophenyl-n-butyrate having observed alphas ($\alpha$) at infinite dilution at 110° C. of 1.29 and 1.25, respectively. Pentachlorophenyl acetate may also be employed. The pentachlorophenylalkyl ethers may also be used as well as the dialkyl tetrachloro-o-phthalates. In general, in using the latter mentioned type of compounds, the longer the side chain, the lower is the melting point and in some cases, it may be desirable to use these types of compounds with a suitable intermediate boiling liquid such as nonaromatic hydrocarbons having a normal boiling point at least 20° C. above the highest boiling aromatic hydrocarbon present in the mixture being separated, particularly when compounds of short side chains are used.

Mixtures of two or more of the compounds of the present invention may be used as the extractive distillation solvent. While it is preferable to use a mixture of the compounds described and claimed herein, it is contemplated that there may be included in the solvent any melting point lowering agent which provides a desirable alpha.

The present invention will be further illustrated by reference to the drawing which is a flow sheet of a preferred mode of practicing the invention. Referring now to the drawing, numeral 11 designates a line through which a $C_8$ aromatic feed, suitably a fraction obtained from a hydroformer, and containing ethylbenzene, ortho, meta, and paraxylene is introduced into the system from a source not shown. The feed stock is introduced into fractional distillation zone 12 provided with line 14 for removal of a light fraction as an overhead fraction, line 15 for removal of orthoxylene as a bottom fraction, and with line 16 for removal of the $C_8$ aromatic fraction containing ethylbenzene and meta and paraxylene. The fraction in line 16 is suitably passed through a cooler-condenser 17 and then routed by way of line 18 and pump 19 to extraction distillation zone 20. A portion of the material in line 18 may suitably be pumped back to fractional distillation zone 12 to serve as and provide reflux.

It is to be understood that distillation zone 12 may involve a plurality of distillation zones or towers provided with suitable internal vapor-liquid contacting means such as bell cap trays and the like and all auxiliary equipment usually associated with the modern distillation tower.

The mixture of ethylbenzene and at least one member of the group of ortho, meta, and paraxylene flows countercurrently in extractive distillation zone 20 to a solvent, of the type illustrated, introduced into zone 20 by line 21 preferably on the top plate thereof. Extractive distillation zone 20 is provided with suitable vapor-liquid contacting means such as bell cap trays and the like and also is provided with a heating means illustrated by steam coil 22 and overhead line 23 and a bottom line 24. Conditions are adjusted in zone 20 to extractively distill the fraction introduced by line 18 to obtain an overhead fraction enriched in ethylbenzene in line 23 which flows to condenser 23a and thence into a reflux drum 25 from which the ethylbenzene may be withdrawn by line 26 controlled by valve 27. Preferably a portion of the ethylbenzene is pumped back into the top of zone 20 by branch line 28 controlled by valve 29 and containing reflux pump 30. The extract from zone 20 flows by way of line 24 into extract stripper 31 provided with a heating means illustrated by steam coil 32 and with line 33 for removal of an overhead fraction and line 34 for withdrawal of the solvent. The solvent in line 34 is suitably returned thereby by way of pump 35 to line 21 with fresh solvent being introduced into line 21 from a source, not shown, by opening valve 36.

Temperature and pressure conditions in zone 20 may be selected to give best results with the particular solvent employed. It is contemplated that operations may be conducted at atmospheric, subatmospheric, or superatmospheric pressure as may be desired. The ratio of hydrocarbons to solvent has an important effect on temperature conditions which may be used. A hydrocarbon to solvent mol ratio of 3:1 to 1:10 may be desirable. A preferred ratio is about 1:1 to 1:2.

The xylenes which may be para and metaxylenes may be withdrawn from the system by opening valve 37 in line 33 but preferably is introduced by line 38 controlled by valve 39 into a chiller 40 through which a suitable refrigerant flows by means, not shown, to reduce the temperature of the fraction to a temperature in the range from −60° to −120° F. to allow separation of the paraxylene from the metaxylene. The chilled fraction is then introduced by way of line 41 into a crystallization zone 42 from which paraxylene crystals are recovered by way of line 43 while the filtrate containing the other xylenes may be withdrawn by way of line 44 and line 45 controlled by valve 46. Preferably, however, the filtrate is reintroduced into line 11 by way of line 44 containing pump 47 and controlled by valve 48 and valve 49.

In a preferred mode of operation, the $C_8$ aromatic feed rather than be introduced by line 11 is introduced into the system by way of line 50 controlled by valve 51 and then flows by way of line 38 and valve 39 into chiller 40 and thence by line 41 into zone 42 from which the paraxylene is removed by line 43. The filtrate containing ortho, para, and metaxylene as well as ethylbenzene then flows by line 44 into line 11 and thence into zone 12 for removal of orthoxylenes as a bottom fraction by way of line 15. The ethylbenzene and metaxylene fraction is then flowed by way of line 16 into extractive distillation zone 20 for separation of ethylbenzene in line 23 and recovery thereof by way of line 27. By this mode of operation, it will be clear that a method of operating is provided by way of which ethylbenzene and the xylenes may be separated and recovered.

It is to be noted that line 11 is controlled by a valve 52 which remains closed when the feed stock is introduced by line 50 and valve 51. It is to be further noted that line 53 controlled by valve 54 is provided for bypassing zone 12. This operation is desirable where feed is introduced by line 50. Also, by-pass line 55 controlled by valve 56 allows zone 12 to be omitted from the flow system. Actually, by-pass line 53 or 55 may be used when feed is introduced by line 50 and by-pass line 53 may be used when orthoxylene is not removed in zone 12.

In order to illustrate the practice of the present invention, comparison was made in extractively distilling a $C_8$ hydroformate after removal of paraxylene by crystallization in a highly efficient fractionating column. In Table III, a comparison is shown at two different reflux ratios of the yields and purities of ethylbenzene obtainable with dichlorobenzene and trichlorobenzene as compared with no solvent.

*Table III*

| Solvent | Reflux Ratio | Ethylbenzene | |
|---|---|---|---|
| | | Yield, Percent | Purity |
| None | 40:1 | 41.4 | 95.4 |
| o-dichlorobenzene | 40:1 | 53.5 | 99.0 |
| 1,2,4-trichlorobenzene | 40:1 | 60.1 | 99.7 |
| None | 25:1 | 49.2 | 78.9 |
| o-dichlorobenzene | 25:1 | 52.5 | 92.6 |
| 1,2,4-trichlorobenzene | 25:1 | 65.1 | 97.3 |

From Table III it will be clear that with a 40:1 reflux ratio using dichloro and trichlorobenzene, it is possible to obtain ethylbenzene purity of greater than 99% at yields of 53.5% and 60.1%, whereas, with a 25:1 reflux ratio, comparable yields are obtained with slightly less purity of the ethylbenzene product. In this case, the feed stock contained 22% ethylbenzene, 10% paraxylene, and 45% metaxylene.

Further operations were conducted in accordance with the present invention. Runs were made in a 50 plate column using binary mixtures charged to the still-pot. Ethylbenzene-paraxylene and ethylbenzene-metaxylene binary mixtures were used. Dichlorobenzene was introduced on the top plate of the column while hydrocarbon was refluxed with no overhead take-off. A solvent concentration of about 50% was maintained on the plates. Samples of overhead and bottom were taken at hourly intervals and the analyses are shown in Table IV.

Table IV

ETHYLBENZENE-PARAXYLENE BINARY

| Time | Solvent Rate, mol/hr. | Reflux Rate, mol/hr. | Percent Solvent on Plates | Temperatures, °F. | | | Percent Ethylbenzene/Percent Paraxylene | |
|---|---|---|---|---|---|---|---|---|
| | | | | Pre-heater | Top Vapor | Btms. | Overhead | Btms. |
| 9:50 | 2.21 | 3.09 | 41.7 | 290 | 280 | 288 | | |
| 10:30 | 2.21 | | | 253 | 280 | 291 | | |
| 11:05 | 2.21 | 1.84 | 54.5 | 254 | 285 | 295 | 3.45 | 0.420 |
| 11:53 | 2.21 | | | 269 | 282 | 297 | | |
| 1:00 | 2.21 | 1.66 | 57.1 | 278 | 288 | 302 | 4.52 | |
| 2:15 | 2.21 | | | 277 | 286 | 306 | 4.83 | |
| 3:00 | 2.21 | | | | | | 5.24 | |
| 2:44 | 2.21 | | | 278 | 285 | 310 | | 0.437 |
| 4:00 | 2.21 | 1.70 | 56.5 | 579 | 290 | 313 | | 0.435 |
| 4:25 | 2.21 | 1.84 | 54.5 | 279 | 291 | 314 | | |

ETHYLBENZENE-METAXYLENE BINARY

| Time | Solvent Rate, mol/hr. | Reflux Rate, mol/hr. | Percent Solvent on Plates | Temperatures, °F. | | | Percent Ethylbenzene/Percent Metaxylene | |
|---|---|---|---|---|---|---|---|---|
| | | | | Pre-heater | Top Vapor | Btms. | Overhead | Btms. |
| 9:50 | 2.21 | 1.98 | 52.8 | 262 | 284 | 291 | | |
| 10:50 | 2.21 | 2.99 | 42.5 | 265 | 285 | 295 | | |
| 11:50 | 2.21 | 2.49 | 47.0 | 248 | 284 | 304 | | |
| 12:50 | 2.21 | 2.49 | 47.0 | 246 | 284 | 305 | 5.38 | |
| 1:30 | 2.21 | 2.49 | 47.0 | 246 | 283 | 309 | 5.40 | 0.285 |
| 2:30 | 2.21 | 2.49 | 47.0 | 246 | 283 | 311 | 5.54 | |
| 3:30 | 2.21 | 2.49 | 47.0 | 248 | 283 | 314 | 5.93 | |
| 4:20 | 2.21 | 2.49 | 47.0 | 248 | 283 | 318 | 6.05 | 0.302 |

When the overhead composition remains unchanged from hour to hour, it is assumed that the column was at equilibrium. At 3:00 o'clock it appears that equilibrium had been approached. It will be seen that fractions enriched in ethylbenzene were obtained referring to Table IV. Using an assumption of a 55% plate efficiency, relative volatilities of 1.095 and 1.115 are obtained for the ethylbenzene-paraxylene and ethylbenzene-metaxylene systems, respectively.

From the operation described in the examples and in the drawing, it will be clear that the present invention is quite advantageous and useful and provides a new mode for separating ethylbenzene from the three xylenes, orthoxylene, metaxylene, and paraxylene.

In a commercial operation, two distillation columns each 3 feet in diameter and 120 feet tall and having 60 actual plates were operated in series as one tower. Commercial 1,2,4-trichlorobenzene was used as the solvent in extractive distillation of an ethylbenzene fraction containing para, meta, and orthoxylene. The combined towers were operated without the solvent in one instance and with the solvent in another instance. In operations without the solvent under total reflux, solvent-free samples taken from the equivalent of the 100th and the 40th plates were analyzed with the following results:

| | Mol percent | |
|---|---|---|
| | 100th plate | 40th plate |
| ethylbenzene | 78.9 | 9.0 |
| p- and m-xylene | 20.5 | 90.8 |
| o-xylene | 0.0 | 0.2 |
| nonaromatics | 0.6 | |

Contrasted with the foregoing results are the following data obtained under the same conditions with the commercial 1,2,4-trichlorobenzene as solvent:

| | Mol percent | |
|---|---|---|
| | 100th plate | 40th plate |
| ethylbenzene | 91.3 | 6.6 |
| p- and m-xylene | 7.0 | 93.0 |
| o-xylene | | |
| nonaromatics | 1.7 | 0.4 |

Some toluene and the orthoxylene were concentrated at the top and bottom of the combined tower, respectively.

The nature and objects of the present invention having been completely described and illustrated, what we wish to claim as new and useful and secure by Letters Patent is:

1. A method for separating a $C_8$ aromatic hydrocarbon mixture consisting essentially of ethylbenzene and at least one member selected from the group consisting of orthoxylene, metaxylene, and paraxylene which comprises distilling said mixture in the presence of a compound containing a single benzene ring substituted on the ring in at least two positions with a chloro group under conditions to separate a fraction enriched in ethylbenzene.

2. A method in accordance with claim 1 in which said compound is dichlorobenzene.

3. A method in accordance with claim 1 in which said compound is trichlorobenzene.

4. A method for separating a $C_8$ aromatic hydrocarbon mixture consisting essentially of ethylbenzene and at least one member selected from the group consisting of orthoxylene, metaxylene, and paraxylene which comprises distilling said mixture countercurrently in the presence of trichlorobenzene and under conditions to separate an overhead fraction enriched in ethylbenzene, and recovering said overhead fraction.

5. A method in accordance with claim 4 in which the member is paraxylene.

6. A method in accordance with claim 4 in which the member is metaxylene.

7. A method in accordance with claim 4 in which the member is orthoxylene.

References Cited in the file of this patent

UNITED STATES PATENTS

| | | | |
|---|---|---|---|
| 1,276,219 | Holmes | Aug. 20, | 1918 |
| 2,111,968 | Ferris | Mar. 22, | 1938 |
| 2,118,766 | Moos et al. | May 24, | 1938 |
| 2,799,629 | Clough et al. | July 16, | 1957 |
| 2,957,811 | Geiser | Oct. 25, | 1960 |